United States Patent
Sheldon

[11] 3,977,605
[45] Aug. 31, 1976

[54] VEHICULAR HERBICIDE SPRAYER

[76] Inventor: Robert T. Sheldon, P.O. Box 486, DeLeon Springs, Fla. 32028

[22] Filed: Oct. 20, 1975

[21] Appl. No.: 624,042

[52] U.S. Cl. .................................. 239/104; 239/74; 239/150; 239/172; 239/288; 239/305; 47/1.7
[51] Int. Cl.² .................... B05B 15/02; B05B 15/04; B05B 1/28
[58] Field of Search ............... 47/1.44, 1.7; 239/68, 239/74, 103, 104, 106, 112, 150, 172, 288, 288.3, 288.5, 304, 305; 222/176

[56] References Cited
UNITED STATES PATENTS

| | | | |
|---|---|---|---|
| 604,479 | 5/1898 | Nichol | 239/104 X |
| 1,188,131 | 6/1916 | Agee | 239/150 |
| 1,462,861 | 7/1923 | Jordan | 239/104 X |
| 1,500,857 | 7/1924 | Woodruff | 239/104 |
| 1,725,581 | 8/1929 | Hendricks | 239/112 |
| 1,911,351 | 5/1933 | Cole | 239/74 X |
| 2,086,055 | 7/1937 | Taylor | 239/172 X |
| 2,115,199 | 4/1938 | Erlandson | 47/1.7 X |
| 2,319,664 | 5/1943 | Davis et al. | 239/288 X |
| 2,424,468 | 7/1947 | Keathley | 239/172 X |
| 2,663,973 | 12/1953 | White | 239/288 X |
| 2,740,664 | 4/1956 | Yates | 239/104 |
| 2,781,050 | 2/1957 | Edwards | 239/68 X |
| 2,822,216 | 2/1958 | Finley et al. | 47/1.7 |
| 2,977,715 | 4/1961 | Lindsay | 239/146 X |
| 3,001,720 | 9/1961 | Cartwright | 239/112 |
| 3,038,665 | 6/1962 | Doerr | 239/104 |
| 3,092,328 | 6/1963 | Patterson et al. | 239/150 |
| 3,158,892 | 12/1964 | Bridger et al. | 239/150 X |
| 3,445,961 | 5/1969 | Elsworth | 47/1.7 |
| 3,584,788 | 6/1971 | Lloyd | 239/172 |
| 3,662,953 | 5/1972 | Wiens | 239/112 |

FOREIGN PATENTS OR APPLICATIONS

| | | | |
|---|---|---|---|
| 126,304 | 12/1947 | Australia | 239/104 |
| 1,096,027 | 12/1967 | United Kingdom | 239/150 |

Primary Examiner—Robert S. Ward, Jr.
Attorney, Agent, or Firm—Morgan, Finnegan, Pine, Foley & Lee

[57] ABSTRACT

A vehicular herbicide spraying apparatus having a mobile support frame, a reservoir for herbicide, a spray means for dispensing the herbicide, a means for measuring the flow rate of the herbicide being sprayed, shields enclosing the spray means to protect plants from herbicide overspray in their vicinity, and cleaning means for intermittently washing off any herbicide which may be retained on the surface of the plant shield.

11 Claims, 5 Drawing Figures

VEHICULAR HERBICIDE SPRAYER

This invention relates to a vehicle-mounted herbicide sprayer equipped with plant shields to protect desirable plants from overspray of herbicide. The sprayer is provided with a herbicide flow rate meter and a spray cleaning means for intermittently removing herbicide from the surface of the plant shields.

BACKGROUND OF THE INVENTION

A variety of vehicle-mounted devices are known for spraying herbicides, and other vehicular apparatus are known for dispensing insecticides. In general, these sprayer devices comprise a mobile frame, or carrier, supporting a reservoir, or tank, from which a chemical herbicide or insecticide solution is pumped through spray nozzles. The flow rate of sprayed material is usually controlled by means of manually operated control valves in the pipelines of the sprayer.

The mobile carrier which supports the reservoir and spraying equipment may be self-propelled, such as the sprayer devices disclosed in Erlandson, U.S. Pat. No. 2,115,199, Doerr, U.S. Pat. No. 3,038,665 and Patterson et al, U.S. Pat. No. 3,092,328. Mobile support frames lacking their own motive means are also known. In these devices the support frame is attached to another device, such as a tractor, which propels the frame and its mounted spraying equipment. Devices of this type are disclosed in Lindsay, U.S. Pat. No. 2,977,715, Taylor, U.S. Pat. No. 2,086,055 and Jordan, U.S. Pat. No. 1,462,861.

The sprayers may also be equipped with shields or "hoods", i.e., enclosures for vegetation. These may be made of rigid, semi-rigid or flexible materials, e.g., metal, plastic, wood, canvas, and the like. In insecticide sprayers, hoods typically prevent dissipation of the insecticide to unplanted areas between sprayed plants and ensure a more efficient distribution of the insecticide on plants being sprayed. In herbicide sprayers, hoods are typically used to enclose desirable plants and to prevent their coming into contact with overspray of harmful herbicide being dispersed in the vicinity.

Conventionally known vehicle-mounted herbicide spray devices have significant shortcomings. For instance, although they are equipped with a means for controlling the amount of herbicide being distributed, e.g., manually operated control valves, they are not provided with any means for accurately measuring the flow rates and amounts of herbicide being dispersed. Also, films or deposits of herbicide may be retained on the surface of the plant shields, and thus when the sprayer is moved across rows of crops or plants, for instance, toxic herbicides may rub off from the shields onto the desirable plants, and cause them to wither and die.

SUMMARY OF THE INVENTION

It is an object of the present invention to provide a vehicular herbicide spray apparatus having a means of measuring the flow rate of herbicide being sprayed on unwanted vegetation so that the amount of dispersed herbicide may be accurately controlled.

It is a further object of the present invention to provide shields for enclosing unwanted vegetation being sprayed with herbicide to protect nearby desirable plants from over-spray of herbicide.

It is another object of the present invention to provide a spray cleaning means for removing herbicide retained on the surface of the plant shields of the sprayer apparatus.

According to the present invention, there is provided a vehicular herbicide sprayer having:
 a. a vehicular support frame,
 b. a herbicide reservoir mounted on the support frame,
 c. a means for measuring the flow rate of herbicide from the reservoir,
 d. a spray means operatively connected to the herbicide reservoir and adapted to apply herbicide to unwanted vegetation,
 e. a vertically disposable shield enclosing said spray means for protecting desirable plants from an overspray of herbicide, and
 f. spray cleaning means for intermittently removing herbicide from the surface of the plant shield.

The spray means for dispersing the herbicide preferably will comprise a plurality of spray nozzles. The spray means may also include a hose and hand gun assembly for spraying selected areas. In especially preferred embodiments, the spray means will comprise a plurality of spray nozzles mounted on a horizontally disposed hollow spray bar, at least one additional spray means enclosed within a plant shield and a further spray means comprising a hose and hand gun.

For measuring the flow rate of sprayed herbicide, a variety of conventional flow rate metering devices may be used, e.g., pitot tube, orifice meter, venturi meter, positive displacement meter, rotameter. A rotameter flow rate indicator is preferred because of its simplicity of design and operation.

The cleaning of the surface of the plant shield is preferably accomplished by means of a water rinse system and especially preferably, a water rinse system directed against the inner surface of the plant shield. The water rinse system comprises a water reservoir, conduit means leading from the reservoir, and a plurality of spray nozzles terminally connected to the conduit means and directed at the surface of the plant shields.

The vehicular support frame is a mobile carriage device which lacks its own means of propulsion, such as a trailer which is attached, in turn, to a motive means, e.g., a tractor. Preferably, the vehicular support frame will be a tractor three-point hitch.

BRIEF DESCRIPTION OF THE DRAWINGS

The invention may be better understood by reference to the accompanying drawings, in which.

DETAILED DESCRIPTION OF THE PREFERRED EMBODIMENTS

Figure 1:
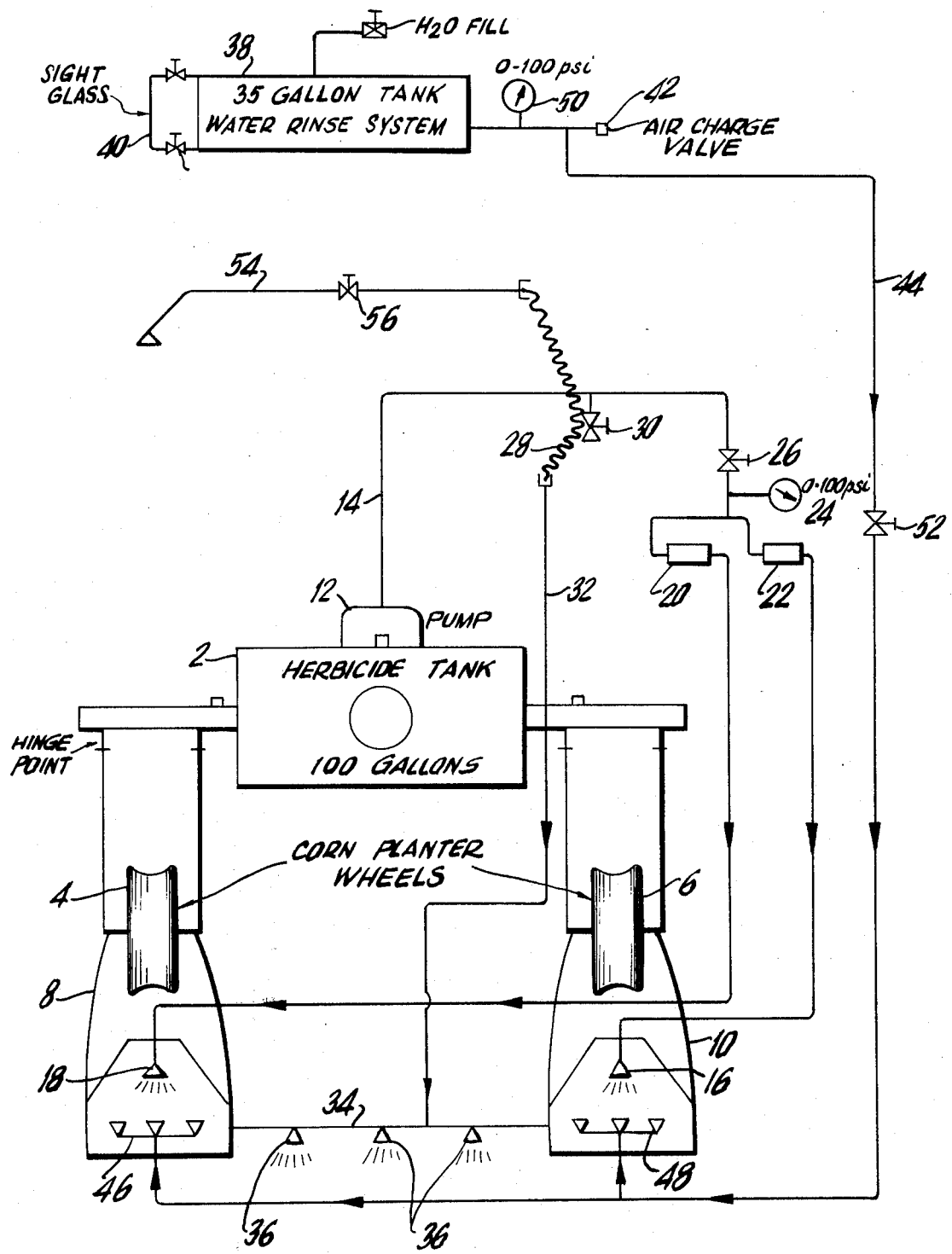
FIG. 1 is a schematic representation of a preferred spraying apparatus according to this invention.
Figure 3:
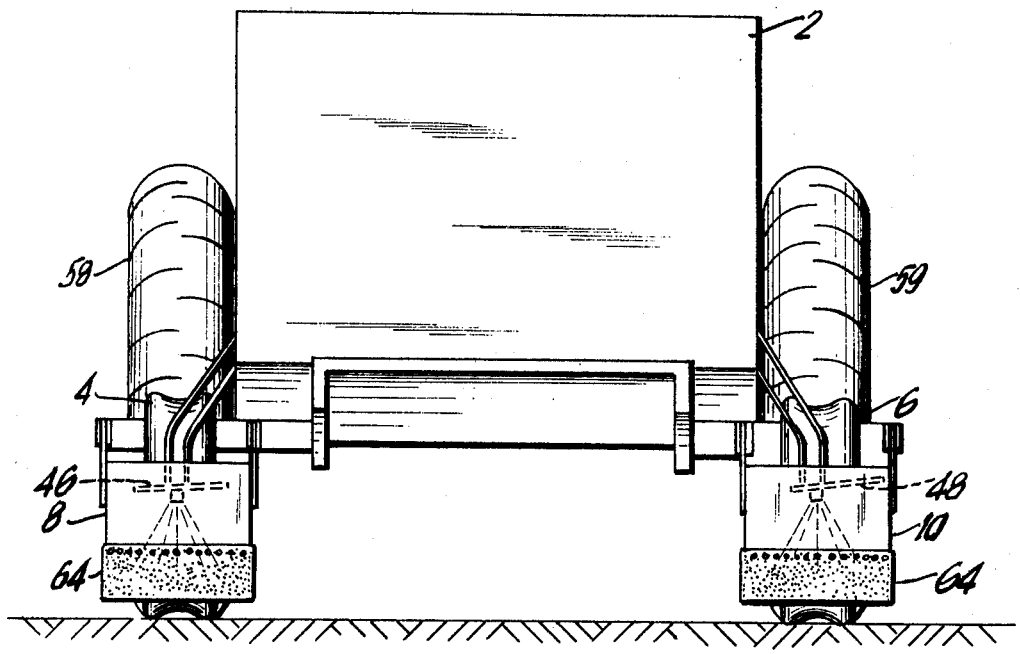
FIG. 3 is a partial rear elevational view of the apparatus of FIG. 1.

The principal objects and advantages of this invention have been set forth above, but these are by no means all-inclusive, and other benefits of the invention will be apparent to those skilled in the art upon consideration of the following detailed disclosure, which refers to the drawings by numerals. In FIG. 1, there is shown a schematic illustration of a spray apparatus according to the present invention. The system is installed on a tractor three-point hitch. The reservoir for the herbicide solution, 100 gallon tank 2, is mounted on the three-point hitch attached to the rear of a tractor (not shown). Corn planter wheels 4 and 6 are mounted in line with tractor wheel center line (FIG. 3). Tin spray shields 8 and 10 are attached near wheels 4 and 6 for enclosure of unwanted vegetation therein to protect nearby desirable plants from herbicide overspray. Although only two wheels for the hitch are illustrated, the number of wheels may be varied in accordance with the width of the area to be sprayed.

The flow of the herbicide solution, e.g., an aqueous solution of Paraquat dichloride 29.1%, 70.9% inert, sold under the name ORTHO PARAQUAT CL by Ortho Division, Chevron Chemical Company, San Francisco, California 94119 or the like, from tank 2 is generally through pump 12 and pipeline 14 to individual spray nozzles 16 and 18. The flow of herbicide is monitored by rotameters 20 and 22, so that the operator can detect drops in the flow rate due to filter screen stoppage and the like. Suitable rotameters are sold by Fischer & Porter Co., Warminster, Pa. U.S.A., under the catalog description Series 10A2235 RATOSIGHT, or equivalent. Pressure gauge 24 is connected to pipeline 14 to measure the internal pressure and hand-operated control valve 26, also in pipeline 14, provides a means for controlling the rate of flow through pipeline 14, and rotameters 20 and 22, to spray nozzles 16 and 18.

Flexible hose connection 28, which is attached to pipeline 32, may be joined to pipeline 14 through valve 30. One leg can lead to hollow spray bar 34, on which is mounted a plurality of spray nozzles 36. Spray bar 34 is terminally connected to pipeline 32 and disposed horizontally with respect to the tractor three-point tractor hitch. By means of this arrangement, the herbicide from tank 2 may be pumped through pipeline 32 and sprayed through nozzles 36, in addition to being pumped through line 14 and nozzles 16 and 18. This permits wide area spraying, such as is needed for removing weeds from roadways.

As an auxiliary means of dispensing the herbicide, hose and spray hand gun assembly 54 may be connected to pipeline 14 through valve 30 by another leg of flexible hose 28. This permits intermittent application of herbicides to selected areas by the operator.

The water rinse system for cleaning herbicide deposited on spray shields 8 and 10 is an essential feature of the apparatus. In one embodiment, this comprises a 35 gallon water tank 38 outfitted with sight glass 40 for visual estimation of the water level in tank 38. The tank can be mounted on the frame or even on the tractor pulling the hitch. Air can be injected into tank 38 through air charge valve 42 to provide pressure forcing water from the tank through pipeline 44 to spray nozzle assemblies 46 and 48. Preferably these are directed at shields 8 and 10 in a direction to provide efficient rinsing of the inner surfaces of shields 8 and 10. The internal pressure of the water rinse system may be monitored by means of pressure gauge 50, and the water flow is controlled by turning valve 52.

In use the operator generally sits on the tractor, within easy reach of the controls and within sight of the flow rate measuring meters and the sight glasses. The sprayer vehicle is positioned so that the herbicide spray heads are enabled to contact the undesired plants. Pump 12 is activated and control valve 26 is opened and the desired spray pattern is established by observing flow rate indicators 20 and 22. The vehicle is moved down the growing field and herbicide is applied. At the end of the application period, valve 26 is closed and valve 52 is opened to start the spray rinsing operation, which is interrupted, when complete, by closing valve 52.

If selected areas are to be sprayed by hand, valve 56 in hose and hand gun combination 54 is opened with pump 12 in operation, and closed as desired.

If a wider area is to be sprayed, then valve 30 will be opened with pump 12 in operation and, optionally, valve 26 will also be opened, to lay down a path of herbicide which typically can range from 60 to 75 inches in width.

Figure 2:
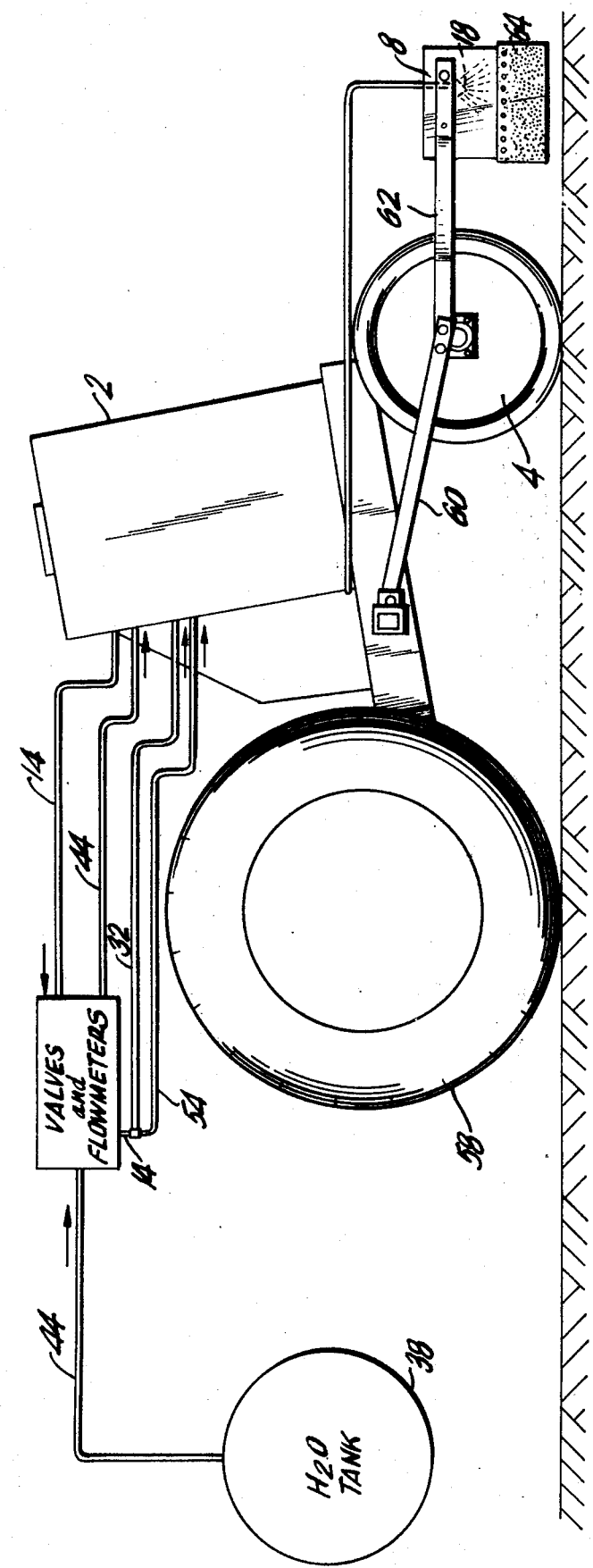
FIG. 2 is a side elevational view, partially schematic, of the apparatus of FIG. 1.
Figures 4, 5:
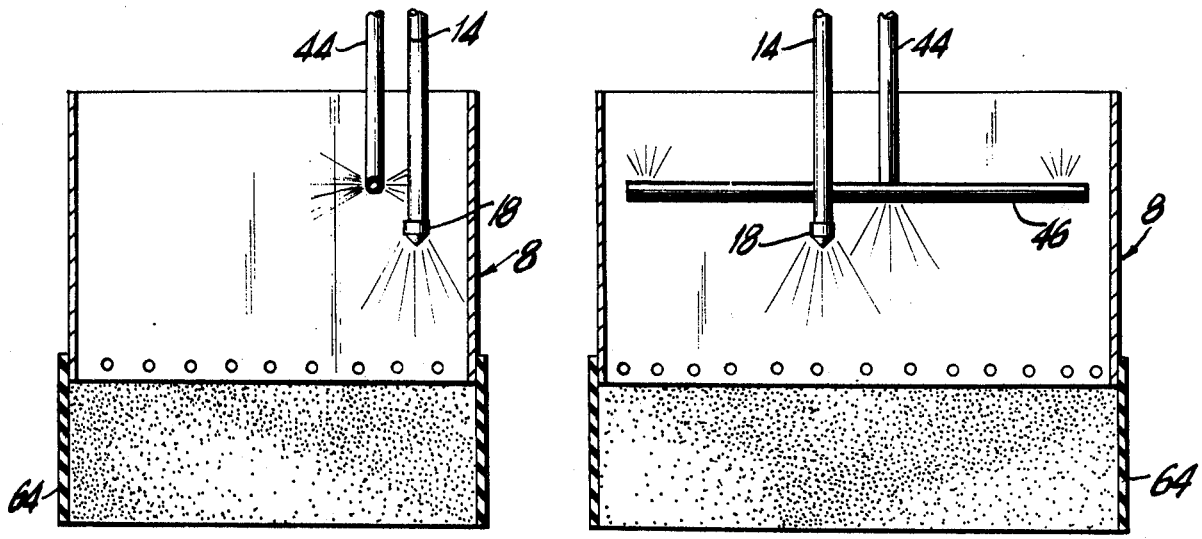
FIGS. 4 and 5 are, respectively, detailed views of the plant shields, side and back, as used in the apparatus of FIG. 1.

FIGS. 2 and 3 illustrate other views of the apparatus for clearer understanding. FIGS. 4 and 5 show even more clearly then FIG. 1 the construction of the plant shields. The same reference numerals depict common elements.

Referring to FIG. 2, tractor wheels 58 are affixed to an axle (not shown) to which is hitched at a typical distance of 1 ft. 3 inches tank 2 of typically 2 ft. 6 inches in height by 1 ft. 4 inches in width. Suspended from the tank hitch are struts 60 and 62 carrying corn planter wheel 4 and spray shield 8. On the bottom of spray shield 8 is affixed flexible shroud 64, which can be a portion of a rubber conveyer belt material riveted to the metal. Typically the vertical dimension of shield 8 is about 1 foot, and the diameter of the corn planter wheel is 1 ft. 8 inches.

Referring now to FIG. 3, tank 2 is seen to be supported between tractor wheels 58 and 59. Typically, tank 2 will be 4 ft. wide. The rear view also shows the arrangement of shields 8 and 10 and the location of water rinse nozzles 46 and 48. Corn planter wheels 4 and 6 are typically 7 inches wide and shields 8 and 10 are 13 inches wide.

In FIG. 4, shield 8 is seen to have openings for water supply line 44 and herbicide supply line 14. FIG. 5 is a back view showing other details.

One typical preferred embodiment of the present sprayer apparatus has been described in detail above and shown in the drawings. However, the present invention is not intended to be limited or restricted to the specific details set forth herein. Other variations and modifications may appear to those skilled in the art which fall within the full intended scope and spirit of the invention as defined in the appended claims.

I claim:
1. A vehicular herbicide sprayer, which comprises:
   a. a vehicular support frame,
   b. a herbicide reservoir mounted on the support frame,
   c. a means for measuring the flow rate of herbicide from the reservoir,
   d. a spray means operatively connected to the herbicide reservoir and adapted to apply herbicide to unwanted vegetation,
   e. a vertically disposable shield enclosing said spray means for protecting desirable plants from an overspray of herbicide, and
   f. spray cleaning means for intermittently removing herbicide from the surface of the plant shield.
2. A sprayer as defined in claim 1 wherein the herbicide spray means comprises a plurality of spray nozzles.

3. A sprayer as defined in claim 1 wherein the spray means for the herbicide also includes a hose and hand gun.

4. A sprayer as defined in claim 1 wherein the means for measuring flow rate is a rotameter.

5. A sprayer as defined in claim 1 wherein the spray cleaning means for said plant shield comprises a water rinse system.

6. A sprayer as defined in claim 5 wherein the water rinse system comprises a water reservoir, conduit means leading from the reservoir, and a plurality of spray nozzles terminally connected to said conduit means and directed at the inner surface of the plant shield.

7. A sprayer as defined in claim 1 wherein the vehicular support frame comprises a three-point tractor hitch.

8. A vehicular herbicide sprayer, which comprises:
   a. a vehicular support frame,
   b. a herbicide reservoir mounted on the support frame,
   c. at least one rotameter flow rate indicator for measuring the flow of herbicide from the reservoir,
   d. at least one spray means operatively connected to the herbicide reservoir and adapted to apply herbicide to unwanted vegetation,
   e. a vertically disposable shield enclosing at least one said spray means for protecting desirable plants from an overspray of herbicide, and
   f. a water rinse spray system for intermittently removing herbicide from the surface of the plant shield.

9. A sprayer as defined in claim 8 wherein the herbicide spray means comprises a plurality of spray nozzles.

10. A vehicular herbicide sprayer, which comprises:
    a. a vehicular support frame,
    b. a tank mounted on the support frame for holding the herbicide,
    c. a pump means for removing herbicide from said tank,
    d. a conduit for carrying herbicide leading from said pump means,
    e. a rotameter flow rate indicator in said conduit for measuring the flow of herbicide through said conduit,
    f. a plurality of valves in said conduit for controlling the rate of flow of herbicide therethrough,
    g. a hollow spray bar terminally connected to said conduit and horizontally disposed in relation to the support frame,
    h. a plurality of spray nozzles mounted on said spray bar and adapted to apply herbicide to unwanted vegetation,
    i. at least one additional spray means operatively connected to the herbicide reservoir and adapted to apply herbicide to unwanted vegetation,
    j. a vertically-disposable shield enclosing said additional spray means for protecting desirable plants from an overspray of herbicide, and
    k. a water rinse system for intermittently removing herbicide from the surface of said plant shield, said system comprising a water tank, conduit means leading from the water tank, and a plurality of spray nozzles terminally connected to the conduit means and directed at the surface of the plant shield.

11. A sprayer as defined in claim 10 which includes a plurality of said additional spray means and a spray means comprising a hose and hand gun and wherein the water rinse system is directed against the inner surface of said shield.

* * * * *